April 20, 1954   F. H. McCLANAHAN ET AL   2,675,650
PULSATION DAMPENER FOR FLOW LINES
Filed July 14, 1950   2 Sheets-Sheet 1
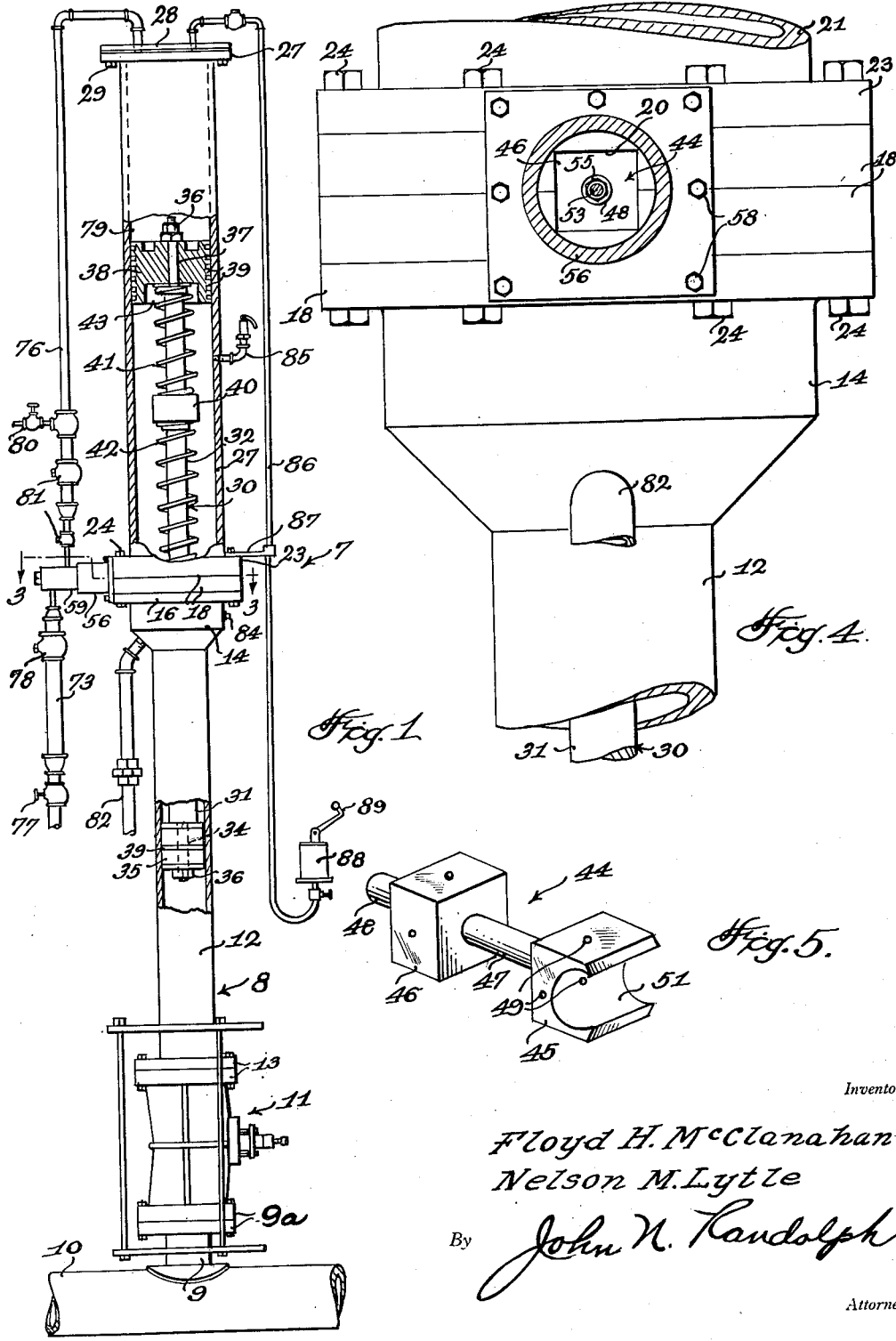
Inventors
Floyd H. McClanahan +
Nelson M. Lytle
By John N. Randolph
Attorney

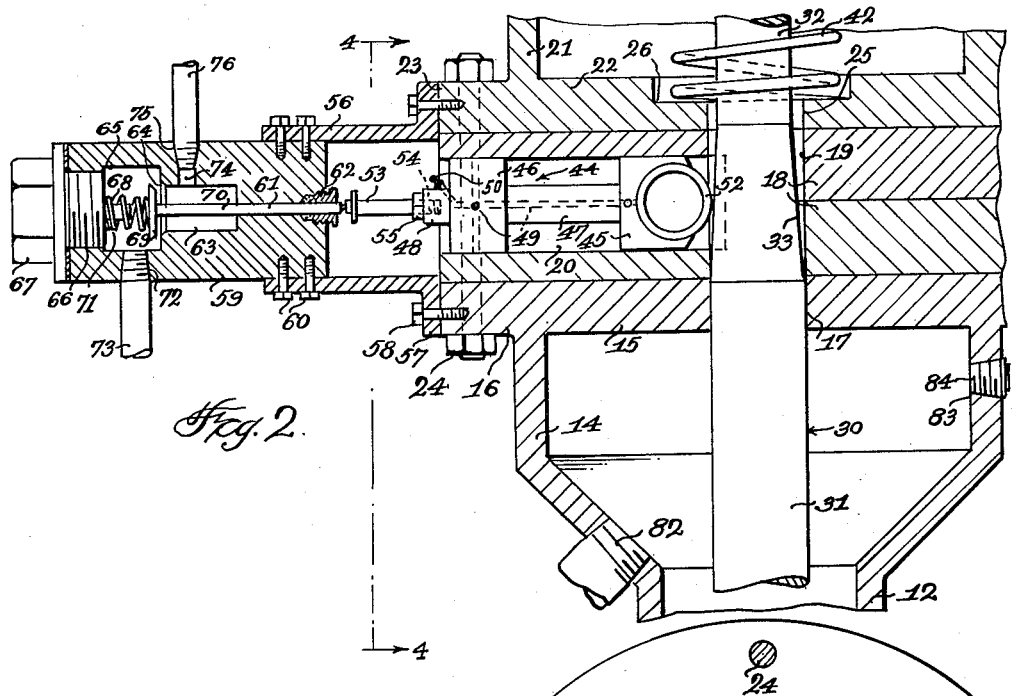
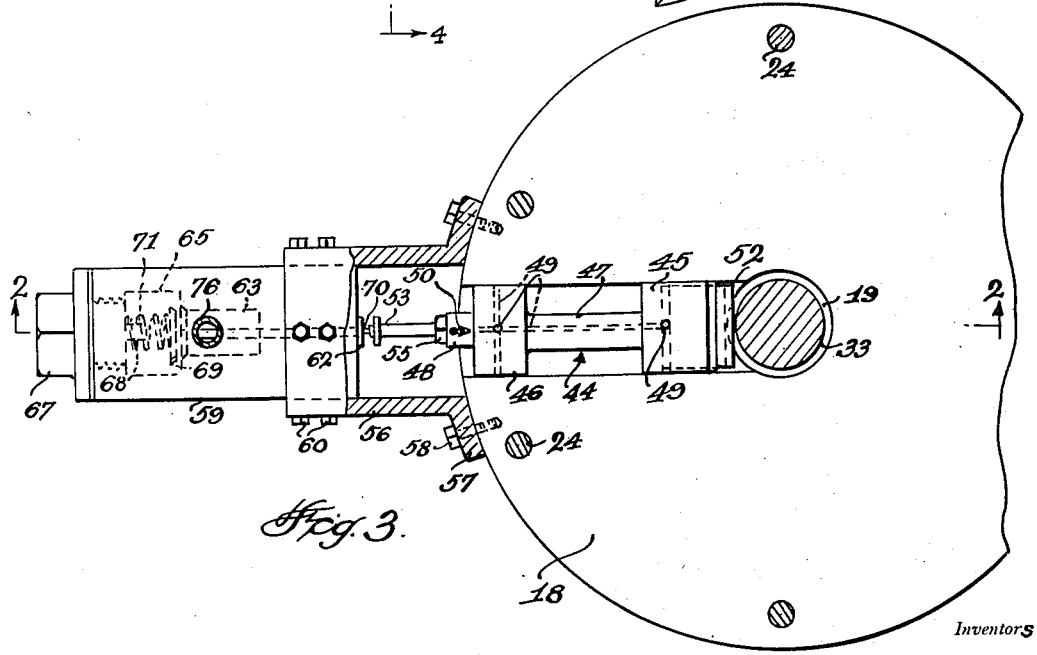

Patented Apr. 20, 1954

2,675,650

UNITED STATES PATENT OFFICE 2,675,650

PULSATION DAMPENER FOR FLOW LINES

Floyd H. McClanahan and Nelson M. Lytle,
Shreveport, La.

Application July 14, 1950, Serial No. 173,854

1 Claim. (Cl. 50—35)

This invention relates to a pulsation or surge dampener adapted to be connected at any point to a high pressure flow line, as for example an oil pipe line forming a part of a service system which is normally under relatively high pressure and wherein fluctuations occur in the pressure causing pulsations or surging pressure.

More particularly, it is a primary object of the present invention to provide a device of extremely simple construction by which surges in the pressure may be dampened and minimized for maintaining a more uniform pressure in the pipe line and which device will also function to effect a balancing action in the case of a loss of pressure in the flow line.

Still a further object of the invention is to provide a pulsation dampening device of extremely simple construction which will function automatically, which will require only slight maintenance and which is capable of effectively accomplishing its intended result.

Various other objects and advantages of the invention will hereinafter become more fully apparent from the following description of the drawings, illustrating a presently preferred embodiment thereof, and wherein:

Figure 1 is a side elevational view, partly in vertical section, showing the pulsation dampener in an applied position;

Figure 2 is an enlarged longitudinal or vertical sectional view of a portion of the device taken substantially along a plane as indicated by the line 2—2 of Figure 3;

Figure 3 is an enlarged horizontal or cross sectional view taken substantially along a plane as indicated by the line 3—3 of Figure 1;

Figure 4 is a vertical sectional view taken substantially along a plane as indicated by the line 4—4 of Figure 2, and Figure 5 is an enlarged perspective view of a part of the apparatus.

Referring more specifically to the drawings, the pulsation dampener in its entirety is designated generally 7 and includes a pipe, designated generally 8, having a lower section 9, the lower end of which is secured to and communicates with a flow line 10, such as a line through which oil is conveyed under pressure, and the upper end of the pipe section 9 is secured by means of abutting flanges 9a to the lower end of the housing of any conventional type manual shutoff valve 11. The upper section 12 of the pipe 8 has a lower end which is secured by similar connected flanges 13 to the upper end of the housing of the valve 11, so that said valve housing forms a part of the conduit provided by the pipe sections 9 and 12. The upper pipe section 12 constitutes a cylinder and is provided with a flared upper end 14 which terminates in a top wall 15 and an outwardly extending flange 16. The top wall 15 is provided with a central opening 17. One or more spacer disks 18 are superimposed on the top wall 15 and are provided with central openings 19 which register with the opening 17. The disks or spacer blocks 18 also have a radial bore 20 of non-circular cross section the inner end of which opens into the bore 19 and the outer end of which opens outwardly of the periphery of the spacer disks 18.

A pipe 21 is provided with a bottom wall 22 which rests upon the upper spacer disk 18 and said pipe 21 is likewise provided with an outwardly projecting flange 23. Suitable bolt and nut fastenings 24 extend through the flanges 16 and 23 and the blocks or disks 18 for securing said parts together and in abutting engagement. The bottom wall 22 is provided with a central opening 25 which likewise registers with the opening 19 and said bottom wall 22 is provided in its upper surface with an annular seat or recess 26 surrounding the opening 25. The upper end of the pipe 21 is provided with an annular flange 27 and is normally closed by a plate or closure 28 which is detachably secured to the flange 27 by fastenings 29.

The pipe section 12 constitutes a bottom cylinder and the pipe 21 constitutes a top cylinder. A piston rod, designated generally 30, has a lower section 31 which is disposed in the cylinder 12 of a larger diameter than its upper section 32 which is normally disposed in the upper cylinder 21. The piston rod 30 extends reciprocally through the openings 17, 19, 25 and is provided with a frusto-conical portion 33 connecting the adjacent ends of the rod portions 31 and 32, as best seen in Figure 2. The rod portion 31 terminates at its lower end in a restricted threaded terminal 34 which extends through a piston 35, which is secured thereon detachably by a nut 36 which engages said threaded terminal. The opposite end of the piston rod 30 is provided with a corresponding restricted threaded shank or terminal 37 forming an extension of the upper end of the rod portion 32 and which extends through a piston 38 which is likewise secured thereon by another nut 36. The pistons 35 and 37 are provided with piston rings 39 and are sized to fit relatively snug in the cylinders 12 and 21, respectively. A collar 40 is slidably mounted on the rod portion 32 within the cylinder 21 between the adjacent ends of two expansion springs 41 and 42 which are mounted on the rod portion 32. The upper coil spring 41 has its upper end seated in a recess 43 in the bottom of the piston 38 and the lower end of the lower coil spring 42 seats in the recess 26, the adjacent ends of said spring seating against opposite sides of the collar 40. It will be readily apparent that the springs 41 and 42 normally urge the pistons 35 and 38 and the piston rod 30 upwardly with respect to the cylinders 12 and 21.

A valve roller guide unit, designated generally 44, includes spaced blocks 45 and 46 which are connected by a restricted stem 47. The block 46 has a threaded socket 48 which projects from the side thereof opposite to the side from which the stem 47 projects. The blocks 45 and 46 are sized to reciprocally engage the radial bore 20 and fit relatively snug therein. The blocks 45 and 46 and the stem 47 are provided with communicating lubricating passages 49 which are provided with a lubricating fitting 50 which projects diagonally from the socket 48. The end of the block 45, remote to the stem 47 is provided with a groove 51 which extends transversely thereacross of arcuate cross section which defines a segment of a circle greater than a half of a circle in which is journaled a roller 52, a portion of the periphery of which projects from the open side of the roller groove 51 toward the bore or opening 19. The lubricating passages 49 open outwardly of the side walls of the blocks 45 and 46 and into the groove 51 for lubricating the radial bore 20 and the roller 52. A shank 53 has a threaded end 54 which threadedly engages the socket 48 and carries a jamb nut 55 for adjustably positioning the shank 53 relatively to said socket to variably space the opposite end of the shank 53 from the socket 48. A sleeve 56 has a flanged end 57 which is secured to portions of the periphery of the flanges 16 and 23 and disks 18 by fastenings 58, so that the sleeve 56 registers with the bore 20 and forms an enlarged continuation thereof, as clearly illustrated in Figures 2, 3 and 4. The shank 58 is normally disposed in the sleeve 56.

An elongated block 59, constituting a valve housing, has one end snugly fitting into the outer end of the sleeve 56 and detachably secured thereto by fastenings 60. The valve housing 59 has a bore extending therethrough from end-to-end thereof including a restricted portion 61 forming a valve stem guide, located adjacent the inner end of the housing 59, one end of which opens into a stuffing box 62 which is provided at the inner end of the housing 59 and the opposite end of which opens into a longitudinally extending chamber 63 formed in the intermediate portion of the housing 59 and constituting an intermediate part of said longitudinal bore. The opposite end of the chamber 63 is flared to provide an annular valve seat 64 and opens into one end of a larger chamber 65. A threaded bore portion 66 constitutes the opposite end of the longitudinal bore of the valve housing 59 and opens outwardly of the outer end of the housing 59 and into the opposite end of the chamber 65 and is normally closed by a threaded plug 67 having a stem 68 projecting from its inner end into and partially through the chamber 65. A valve 69 is disposed in the chamber 65 and normally seats in the valve seat 64 and has a stem 70 which extends longitudinally through the chamber 63, through the guide bore 61 and stuffing box 62 and the opposite end of which projects into the sleeve 56 and bears against the outer end of the shank 53. An expansion coil spring 71 is disposed in the chamber 65 on the stem 68 and bears with one end against the plug 67 and has its opposite end bearing against the outer side of the valve 69 for urging the valve toward the seat 64. A threaded port 72 communicates with the chamber 65 and opens outwardly of the bottom of the valve housing 59 to receive a threaded end of a pipe 73 which opens into said chamber 65. A port 74 communicates with the chamber 63 and has a threaded end 75 which opens outwardly of the top of the housing 59 and in which a threaded end of a pipe 76 is detachably secured, so that said pipe end communicates with the chamber 63.

The opposite end of the pipe 73, not shown, may be supplied with air or gas under pressure by being connected to a suitable source of air supply, not shown, such as an air tank or air compressor, or to a gas line for receiving pressure therefrom. The conduit 73 is provided with a manual shutoff valve 77 which is ordinarily open when the apparatus 7 is in operation, and is also provided with a conventional air or gas strainer 78. The opposite end of the upper conduit 76 is connected to the closure 28 and opens into the chamber 79 formed by a portion of the cylinder 21 disposed above the piston 38. The conduit 76 includes bleeder port 80 equipped with a manual shutoff valve and a plurality of conventional check valves 81 disposed between the bleeder port and the valve housing 59. An overflow pipe 82 has one end connected to the flared pipe portion 14 and the opposite end thereof, not shown, may open into any suitable sump or other discharge. The flared pipe portion 14 is also provided with an inspection opening 83 normally closed by a plug 84. The cylinder 21, below the normal position of the piston 38 is provided with a conventional type of low pressure release valve 85. The chamber 79 may be lubricated by a conduit 86 which is supported by a bracket 87 secured to one of the fastenings 24, said conduit having one end opening into the chamber 79 through the closure 28. A conventional lubricator 88 of a type adapted to be manually operated is connected to the opposite end of the conduit 86 and may be manually operated by its hand lever 89 when required for pumping a lubricant into the chamber 79 for lubricating the piston 38.

The valve 11 is only closed when it is desired to shut off the surge dampener 7 from the line 10 while making repairs or inspecting the internal parts of the apparatus. Assuming that the valves 11 and 77 are open, when the valve 11 is initially opened the fluid under pressure from the pipe 10 will enter the cylinder 12 below the piston 35 to displace the pistons 35 and 38 and the piston rod 30 upwardly from positions below their positions as illustrated in the drawings. At the time of initial upward movement of the piston rod 30, the valve 69 will be closed due to the fact that the spring 71 will have projected said valve and the roller guide unit 44 to the right of its position of Figure 2. As the pistons and rod 30 move upwardly the frusto-conical portion 33 of the rod 30 will move into the bore 19 and into contact with the roller 52. Further upward movement of the rod 30 will cause the frusto-conical portion 33 to cam the roller guide unit 44 from right to left of Figure 2 to its position of this figure thereby exerting a thrust upon the valve stem 70 to displace the valve 69 to its open position of Figure 2. The roller 52 revolves in its journal groove 51 by frictional contact with the piston rod 30 when said rod is reciprocated. As soon as the valve 69 is thus un-seated, air or gas under pressure from the line 73 will pass through the valve chambers 65 and 63 into the line 76 and through said line into the cylinder chamber 79. When a sufficient amount of gas or air under pressure has thus entered the chamber 79 to overcome the pressure in the cylinder 12 below the piston 35 and the pressure of the springs 41 and 42, the pistons 35 and 38 and piston rod 30 will be displaced downwardly until the frusto-conical rod portion 33 moves to a position below the roller 52, so that the spring 68 can return the valve 69 to a closed position and the apparatus 7 will then be in a balanced condition. In the event of a surge of pressure in the line 10, the increased pressure thus resulting in the cylinder 12 below the piston 35 will displace the pistons and rod 30 upwardly to admit additional air or gas pressure, as previously described to the chamber 79, until the apparatus is again returned to a balanced condition and with the valve 69 closed. In the event of a sudden drop or total loss of pressure in the line 10, the springs 41 and 42 will prevent the pistons and rod 30 from moving downwardly too rapidly and when the piston 38 has moved below the release valve 85, the air or gas pressure in the chamber 79 will escape therethrough. The valve 85 is constructed to restrict the escape of the air or gas pressure to prevent sudden unloading of the chamber 79, and after a sufficient unloading thereof, the apparatus will again return to a balanced position. Fluid or vapor escaping past the piston 35 will pass off through the overflow pipe 82 and air or gas escaping past the piston 38 may escape through the bores 17, 19, 25 when the rod 30 is below its position of Figure 2 and may likewise escape through the overflow pipe 82 to prevent the pistons being blocked from movement by a pressure in the cylinder portions disposed therebetween. The roller 52 is constructed of a spark proof material to prevent accidental ignition of any vapors in the flared pipe portion 14. Likewise, the leakage of the air or gas pressure past the piston 38 will be sufficient to prevent a pressure rise in the chamber 79 sufficient to prevent normal operation of the pulsation dampener.

From the foregoing it will be readily apparent that the surge or pulsation dampener 7 may be readily attached to a pressure flow line and will effectively function to dampen surges of pressure therein and to maintain more uniform pressure at all times. It will likewise be obvious that the apparatus will require little maintenance and attention and will function automatically to accomplish its intended result.

Various modifications and changes are contemplated and may obviously be resorted to, without departing from the spirit or scope of the invention as hereinafter defined by the appended claim.

We claim as our invention:

In a pulsation dampener for a fluid pressure line, a piston rod having a tapered cam portion intermediate of its ends tapering toward one end thereof, a piston rod guide through which the piston rod reciprocably extends, a valve housing connected to the piston rod guide and adapted to be interposed in a conduit for supplying a medium under pressure to an end of a cylinder in which the piston rod is disposed, a valve biased to a closed position contained in said valve housing for shutting off the flow through the conduit, and a valve actuator reciprocably mounted in the piston rod guide having one end engaging the piston rod and an opposite end engaging the valve, said valve actuator being urged toward the piston rod by the biased valve and being displaced toward the valve by engagement with the cam portion of the piston rod when the piston rod is moved in one direction to unseat said valve to permit the fluid medium under pressure to pass through the conduit, said valve actuator including a block having a groove extending thereacross in a direction transversely of the longitudinal axis of the valve actuator, a roller journaled in said groove and having a portion of its periphery projecting therefrom and frictionally engaging the piston rod, the axis of the roller being disposed at a right angle to the axis of the piston rod, said valve actuator having lubricating means therein including discharge ports opening outwardly of the walls of said block which engage the piston rod guide and outwardly of said groove for lubricating the block and roller.

References Cited in the file of this patent
UNITED STATES PATENTS

| Number | Name | Date |
|---|---|---|
| 359,315 | Cregier | Mar. 15, 1887 |
| 477,468 | Sutcliffe | June 21, 1892 |
| 594,787 | Gallagher | Nov. 30, 1897 |
| 1,593,122 | Hallstead | July 20, 1926 |
| 1,948,988 | Lupfer | Feb. 27, 1934 |
| 2,286,880 | Traut | June 16, 1942 |
| 2,368,852 | Lauck | Feb. 6, 1945 |
| 2,415,258 | Parker et al. | Feb. 4, 1947 |